United States Patent
Yishay

(10) Patent No.: US 9,639,520 B2
(45) Date of Patent: May 2, 2017

(54) SYSTEM AND METHOD FOR KEYWORD SPOTTING USING REPRESENTATIVE DICTIONARY

(71) Applicant: Verint Systems Ltd., Herzelia, Pituach (IL)

(72) Inventor: Yitshak Yishay, Revava (IL)

(73) Assignee: VERINT SYSTEMS LTD., Herzelia, Pituach (IL)

(*) Notice: Subject to any disclaimer, the term of this patent is extended or adjusted under 35 U.S.C. 154(b) by 643 days.

(21) Appl. No.: 14/167,052

(22) Filed: Jan. 29, 2014

(65) Prior Publication Data

US 2014/0214407 A1  Jul. 31, 2014

(30) Foreign Application Priority Data

Jan. 29, 2013  (IL) .......................................... 224482

(51) Int. Cl.
*G06F 17/27* (2006.01)
*G06F 21/55* (2013.01)

(52) U.S. Cl.
CPC ...... *G06F 17/2735* (2013.01); *G06F 17/2775* (2013.01); *G06F 21/55* (2013.01)

(58) Field of Classification Search
CPC .. G06F 17/27; G06F 17/2705; G06F 17/2735; G06F 17/2775; G06F 17/2795
See application file for complete search history.

(56) References Cited

U.S. PATENT DOCUMENTS

| | | | | | |
|---|---|---|---|---|---|
| 4,672,571 A | * | 6/1987 | Bass | ..................... | G06F 17/273 400/63 |
| 4,701,851 A | * | 10/1987 | Bass | ..................... | G06F 17/273 369/83 |
| 4,706,212 A | * | 11/1987 | Toma | ..................... | G06F 17/271 434/157 |
| 5,006,849 A | * | 4/1991 | Baarman | ................. | H03M 7/42 341/106 |
| 5,410,475 A | * | 4/1995 | Lu | ......................... | G06F 17/278 704/1 |

(Continued)

OTHER PUBLICATIONS

Liu, Rong-Tai, et al., "A Fast Pattern-Match Engine for Network Processor-based NIDS," Proceedings of the 20th International Conference on Information Technology (ITCC'04), Dec. 5, 2006, 23 pages.

(Continued)

*Primary Examiner* — Eric Yen
(74) *Attorney, Agent, or Firm* — Meunier Carlin & Curfman

(57) ABSTRACT

Methods and systems for keyword spotting, i.e., for identifying textual phrases of interest in input data. In the embodiments described herein, the input data comprises communication packets exchanged in a communication network. The disclosed keyword spotting techniques can be used, for example, in applications such as Data Leakage Prevention (DLP), Intrusion Detection Systems (IDS) or Intrusion Prevention Systems (IPS), and spam e-mail detection. A keyword spotting system holds a dictionary of textual phrases for searching input data. In a communication analytics system, for example, the dictionary defines textual phrases to be located in communication packets—such as e-mail addresses or Uniform Resource Locators (URLs).

20 Claims, 2 Drawing Sheets

(56) References Cited

U.S. PATENT DOCUMENTS

| | | | | |
|---|---|---|---|---|
| 5,448,474 | A * | 9/1995 | Zamora | G06F 17/2863 400/110 |
| 5,623,406 | A * | 4/1997 | Ichbiah | G06F 3/0489 704/3 |
| 5,689,442 | A | 11/1997 | Swanson et al. | |
| 5,748,781 | A * | 5/1998 | Datta | G06T 9/004 345/673 |
| 5,805,911 | A * | 9/1998 | Miller | G06F 17/276 715/234 |
| 5,850,561 | A * | 12/1998 | Church | G06F 17/2795 715/234 |
| 6,012,057 | A * | 1/2000 | Mayer | G06F 17/30985 |
| 6,137,911 | A * | 10/2000 | Zhilyaev | G06K 9/62 345/440 |
| 6,185,524 | B1 * | 2/2001 | Carus | G06F 17/277 704/9 |
| 6,240,408 | B1 * | 5/2001 | Kaufman | G06F 17/3061 707/730 |
| 6,404,857 | B1 | 6/2002 | Blair et al. | |
| 6,718,023 | B1 | 4/2004 | Zolotov | |
| 6,757,361 | B2 | 6/2004 | Blair et al. | |
| 7,216,162 | B2 | 5/2007 | Amit et al. | |
| 7,466,816 | B2 | 12/2008 | Blair | |
| RE40,634 | E | 2/2009 | Blair et al. | |
| 7,587,041 | B2 | 9/2009 | Blair | |
| 7,925,498 | B1 * | 4/2011 | Baker | G06F 17/2795 704/10 |
| 8,327,265 | B1 * | 12/2012 | Vogel | G06F 17/271 704/4 |
| 8,898,063 | B1 * | 11/2014 | Sykes | G06Q 40/04 704/270 |
| 9,058,813 | B1 * | 6/2015 | Blanksteen | G10L 15/19 |
| 9,230,160 | B1 * | 1/2016 | Kanter | G06K 9/00355 |
| 2002/0077808 | A1 * | 6/2002 | Liu | G06F 3/0237 704/10 |
| 2002/0099744 | A1 * | 7/2002 | Coden | G06F 17/273 715/267 |
| 2002/0123882 | A1 * | 9/2002 | Mohammed | G06F 17/273 704/10 |
| 2004/0122661 | A1 * | 6/2004 | Hawkinson | G06F 17/2785 704/10 |
| 2004/0210434 | A1 * | 10/2004 | Wang | G06F 17/274 704/9 |
| 2004/0249631 | A1 * | 12/2004 | Harris | G06K 19/041 704/7 |
| 2005/0278309 | A1 * | 12/2005 | Evans | G06F 17/3087 |
| 2007/0074131 | A1 * | 3/2007 | Assadollahi | G06F 3/0237 715/816 |
| 2007/0159968 | A1 * | 7/2007 | Cutaia | H04L 47/10 370/229 |
| 2008/0014873 | A1 | 1/2008 | Krayer et al. | |
| 2008/0162137 | A1 * | 7/2008 | Saitoh | G10L 15/22 704/251 |
| 2008/0178076 | A1 * | 7/2008 | Kritt | G06F 17/273 715/257 |
| 2008/0261192 | A1 | 10/2008 | Huang et al. | |
| 2008/0285464 | A1 | 11/2008 | Katzir | |
| 2008/0319738 | A1 * | 12/2008 | Liu | G06F 17/277 704/10 |
| 2010/0023318 | A1 * | 1/2010 | Lemoine | G06F 17/2775 704/9 |
| 2010/0030553 | A1 * | 2/2010 | Ball | G06F 17/2715 704/9 |
| 2011/0035211 | A1 * | 2/2011 | Eden | G06F 17/2735 704/10 |
| 2012/0053926 | A1 * | 3/2012 | Satpute | G06F 3/0236 704/8 |
| 2012/0179694 | A1 * | 7/2012 | Sciacca | G06F 17/30672 707/748 |
| 2012/0239667 | A1 * | 9/2012 | Vysyaraju | G06F 17/30876 707/749 |

OTHER PUBLICATIONS

Rohde & Schwarz GmbH & Co. KG, "ACCESSNET-T, DMX-500 R2, Digital Mobile eXchange," Product Brochure, Secure Communications, Mar. 2000, 4 pages.

Rohde & Schwarz GmbH & Co. KG, "ACCESSNET-T IP," Product Brochure, Secure Communications, Jan. 2000, 4 pages.

Rohde & Schwarz GmbH & Co. KG, "R&S AllAudio Integrierte digitale Audio-Software," Product Brochure, Feb. 2002, 12 pages.

Rohde & Schwarz GmbH & Co. KG, "R&S AllAudio Integrated Digital Audio Software," Product Brochure, Radiomonitoring & Radiolocation, Feb. 2000, 12 pages.

Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.

Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.

Rohde & Schwarz GmbH & Co. KG, "R&S RAMON COMINT/CESM Software," Product Brochure, Radiomonitoring & Radiolocation, Jan. 2000, 22 pages.

Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "R&S RA-CM Continuous Monitoring Software," Product Brochure, Radiomonitoring & Radiolocation, Jan. 2001, 16 pages.

Rohde & Schwarz GmbH & Co. KG, "Integrated Digital Audio Software R&S AllAudio," Specifications, 8 pages.

Metronome SSL Inspector Solution Overview White Paper, "Examining SSL-encrypted Communications," 2010, 8 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Fisk, Mike, et al., "Applying Fast String Matching to Intrusion Detection," Los Alamos National Laboratory and University of California San Diego, 22 pages.

Fox Replay BV, "FoxReplay Analyst," http//www.foxreplay.com, Revision 1.0, Nov. 2007, 5 pages.

Fox-IT BV, "FoxReplay Analyst," Product Brochure, http//www.foxreplay.com, 2 pages.

Aho, Alfred V., et al., "Efficient String Matching: An Aid to Bibliographic Search," Communication of the ACM, Jun. 1975, vol. 18, No. 6, pp. 333-340.

Coffman, T., et al., "Graph-Based Technologies for Intelligence Analysis," CACM, Mar. 2004, 12 pages.

Cloudshield, Inc., "Lawful Intercept Next-Generation Platform," 2009, 6 pages.

Goldfarb, Eithan, "Mass Link Analysis: Conceptual Analysis," 2006, Version 1.1, 21 pages.

Verint Systems Inc., "Mass Link Analysis: Solution Description," Dec. 2008, 16 pages.

High-Performance LI with Deep Packet Inspection on Commodity Hardware, ISS World, Singapore, Jun. 9-11, 2008, Presenter: Klaus Mochalski, CEO, ipoque, 25 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Schulzrinne, H., et al., "RTP: A Transport Protocol for Real-Time Applications," Standards Track, Jul. 2003, 89 pages.

Sheng, Lei, "A Graph Query Language and Its Query Processing," IEEE, Apr. 1999, pp. 572-581.

Soghoian, Christopher, et al., "Certified Lies: Detecting and Defeating Government Interception Attacks Against SSL," 2010, 19 pages.

(56) References Cited

OTHER PUBLICATIONS

Svenson, Pontus, "Social network analysis and information fusion for anti-terrorism," CIMI, 2006, 8 pages.
Tongaonkar, Alok S., "Fast Pattern-Matching Techniquest for Packet Filtering," Stony Brook University, May 2004, 44 pages.
Yu, Fang, et al., "Fast and Memory-Efficient Regular Expression Matching for Deep Packet Inspection," ANCS'06, Dec. 3-5, 2006, San Jose, California, 10 pages.
Yu, Fang, et al., "Gigabit Rate Packet Pattern-Matching Using TCAM," Proceedings of the 12th IEEE International Conference on Network Protocols (ICNP'04), 2004, 10 pages.

\* cited by examiner

ERGIEUVSLIUVHKJCVNZLVFDNHSKSCKLCCMLSDJAJ...
ASLK(?)EFHAKCLXPOWEIRREYUIREGLHVSNKNLSDI(?)FOPO...
EPORUERPIOIHYNVKCXLOIJFLKDOPSLCXMVPOIWELDC...
...
AOIUTREIOIKCNBMVCMUVBINO(?.?.?)UILLUYKTOIREUYSTS...
WAERTYU(?.?)MOPLCLVNBRJVECFDRTYUDLRFPDLEPOSSE...
ZXCDSFTREYYUKIOILK(?.?.?)XCDEWREIOLIUPMHYNCXVETRR...
...
OICKCNMLKXNCLKSAUFDINWAODCLKXNZXDJODJODL...

FIG. 3

SYSTEM AND METHOD FOR KEYWORD SPOTTING USING REPRESENTATIVE DICTIONARY

FIELD OF THE DISCLOSURE

The present disclosure relates generally to data processing, and particularly to methods and systems for textual search.

BACKGROUND OF THE DISCLOSURE

Keyword searching techniques are used in a wide variety of applications. For example, in some applications, communication traffic is analyzed in an attempt to detect keywords that indicate traffic of interest. Some data security systems attempt to detect information that leaks from an organization network by detecting keywords in outgoing traffic. Intrusion detection systems sometimes identify illegitimate intrusion attempts by detecting keywords in traffic.

Various keyword searching techniques are known in the art. For example, Aho and Corasick describe an algorithm for locating occurrences of a finite number of keywords in a string of text, in "Efficient String Matching: An Aid to Bibliographic Search," Communications of the ACM, volume 18, no. 6, June, 1975, pages 333-340, which is incorporated herein by reference. This technique is commonly known as the Aho-Corasick algorithm. As another example, Yu et al. describe a multiple-pattern matching scheme, which uses Ternary Content-Addressable Memory (TCAM), in "Gigabit Rate Packet Pattern-Matching using TCAM," Proceedings of the 12$^{th}$ IEEE International Conference on Network Protocols (ICNP), Berlin, Germany, Oct. 5-8, 2004, pages 174-183, which is incorporated herein by reference.

SUMMARY OF THE DISCLOSURE

An embodiment that is described herein provides a method including holding a first dictionary including first textual phrases for searching in data. A second dictionary, which includes second textual phrases and has a smaller data size than the first dictionary, is derived from the first dictionary such that occurrence of any of the first textual phrases in the data corresponds to the occurrence of at least one of the second textual phrases in the data. Input data is searched with the second dictionary. In response to identifying in the input data a second textual phrase from the second dictionary, a first textual phrase from the first dictionary, corresponding to the identified second textual phrase, is located in the input data.

In some embodiments, the second dictionary is derived such that any occurrence of one of the second textual phrases indicates the occurrence of one of the first textual phrases with a likelihood higher than a predefined threshold. In some embodiments, holding the first dictionary includes storing the first dictionary in a first memory having a first access speed, and deriving the second dictionary includes storing the second dictionary in a second memory having a second access speed that is higher than the first access speed. In an embodiment, searching the input data includes processing the input data using a processor, and the second memory includes a cache memory of the processor.

In another embodiment, identifying the second textual phrase includes specifying a partial subset of the first textual phrases based on the identified second textual phrase, and locating the first textual phrase includes searching only the partial subset of the first textual phrases. In yet another embodiment, identifying the second textual phrase includes indicating a position in the input data where the first textual phrase is expected, and locating the first textual phrase includes accessing the input data in a vicinity of the indicated location. In a disclosed embodiment, deriving the second dictionary includes excluding from the second dictionary one or more second textual phrases that are expected to cause false detections while searching the input data with the second dictionary.

In some embodiments, deriving the second dictionary includes defining one or more lists of the second textual phrases, such that, in each list, the second textual phrases are derived as the sub-strings of respective ones of the first textual phrases that begin at a given constant position in the first textual phrases and have a given constant length. In an embodiment, one or more of the first textual phrases include wildcard characters, and defining the lists includes choosing the lists such that the second textual phrases do not include any of the wildcard characters.

In another embodiment, defining the lists includes including a respective sub-string of each first textual phrase in at least one of the lists. In yet another embodiment, searching the input data with the second dictionary includes applying a hash function to a portion of the input data, and comparing a result of the hash function to the sub-strings in a given list. In still another embodiment, in response to an update including an addition, a deletion or a modification of one or more of the first textual phrases in the first dictionary, the method includes modifying one or more of the lists so as to match the second dictionary to the updated first dictionary.

There is additionally provided, in accordance with an embodiment that is described herein, apparatus including a memory and a processor. The memory is configured to hold a first dictionary including first textual phrases for searching in data. The processor is configured to derive from the first dictionary a second dictionary, which includes second textual phrases and has a smaller data size than the first dictionary, such that occurrence of any of the first textual phrases in the data corresponds to the occurrence of at least one of the second textual phrases in the data, to search input data with the second dictionary, and, in response to identifying in the input data a second textual phrase from the second dictionary, to locate in the input data a first textual phrase from the first dictionary corresponding to the identified second textual phrase.

The present disclosure will be more fully understood from the following detailed description of the embodiments thereof, taken together with the drawings in which:

BRIEF DESCRIPTION OF THE DRAWINGS

FIG. 3 is a diagram that schematically illustrates a full dictionary and a representative dictionary used in a keyword spotting process, in accordance with an embodiment that is described herein.

DETAILED DESCRIPTION OF EMBODIMENTS

Overview

Figure 1:
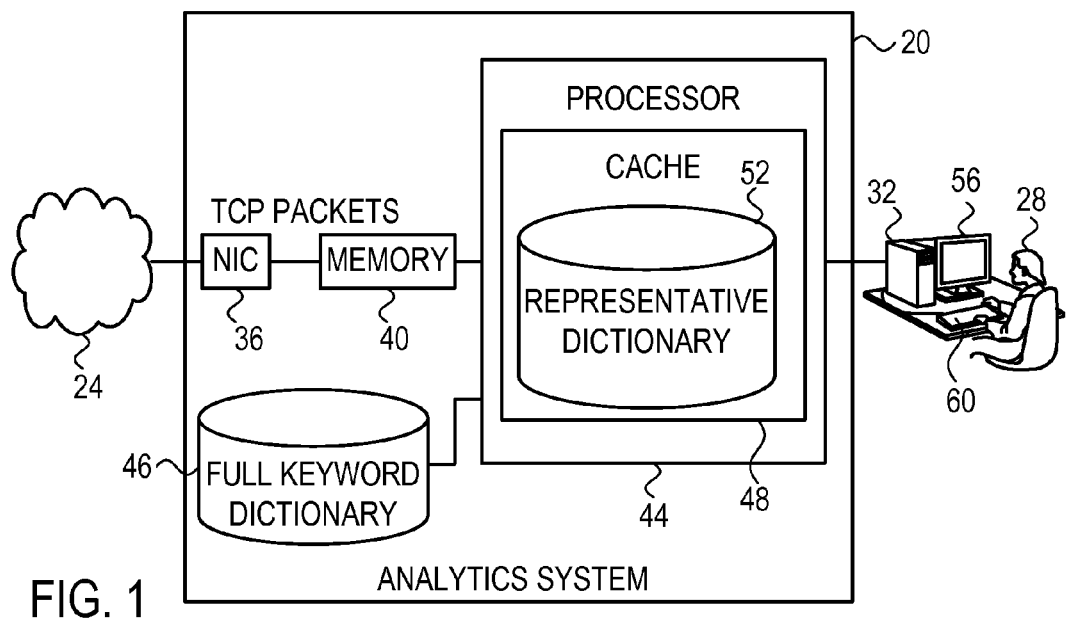
FIG. 1 is a block diagram that schematically illustrates a system for keyword searching, in accordance with an embodiment that is described herein.

Embodiments that are described herein provide improved methods and systems for keyword spotting, i.e., for identifying textual phrases of interest in input data. In the embodiments described herein, the input data comprises communication packets exchanged in a communication network. The disclosed keyword spotting techniques can be used, for example, in applications such as Data Leakage Prevention (DLP), Intrusion Detection Systems (IDS) or Intrusion Prevention Systems (IPS), and spam e-mail detection.

In the disclosed embodiments, a keyword spotting system holds a dictionary of textual phrases for searching input data. In a communication analytics system, for example, the dictionary defines textual phrases to be located in communication packets—such as e-mail addresses or Uniform Resource Locators (URLs).

In some applications, the dictionary comprises a large number of textual phrases, e.g., on the order of thousands or more, which may differ in size from one another. Each textual phrase in the dictionary typically comprises a string of characters, and in some embodiments may comprise various wildcard characters. Moreover, the dictionary may change over time, e.g., textual phrases may be added, deleted or modified. In the description that follows, the above-described dictionary is referred to as a full dictionary, and the textual phrases are also referred to as keywords or key phrases.

In some embodiments, the system derives from the full dictionary a reduced-size dictionary that is representative of the full dictionary. The representative dictionary typically comprises sub-strings of textual phrases from the full dictionary. The system defines the representative dictionary so as to meet several conditions:

The overall data size of the representative dictionary is considerably smaller than that of the full dictionary. For example, the sub-strings in the representative dictionary are typically much shorter that the textual phrases in the full dictionary. Moreover, several textual phrases in the full dictionary may be represented using the same sub-string in the representative dictionary.

Any occurrence of a textual phrase of the full dictionary in the input data corresponds to a respective occurrence of a sub-string of the representative dictionary. In other words, searching the input data with the representative dictionary instead of the full dictionary will not miss any occurrences of textual phrases.

Detecting a sub-string from the representative dictionary in the input data is highly likely to indicate an occurrence of a textual phrase from the full dictionary. In other words, searching the input data with the representative dictionary instead of the full dictionary will not cause a high number of false-positive detections.

The representative dictionary does not contain phrases or words that are very common and therefore likely to cause a large number of false detections.

The system then searches the input data using the representative dictionary. Upon finding a certain sub-string (of the representative dictionary) at a certain location in the input data, the system attempts to locate a corresponding textual phrase (of the full dictionary) in the vicinity of this location.

Searching the input data using the small representative dictionary instead of the full dictionary significantly reduces the search time and complexity. For example, in some embodiments the representative dictionary is small enough to fit in a fast internal cache memory of the system, while the full dictionary has to be stored in some slower external memory. In such embodiments, the slower external memory is accessed only upon detecting a sub-string using fast cache access operations. At the same time, this sort of search does not degrade the search performance.

In some embodiments, the representative dictionary comprises one or more "rectangles" derived from the textual phrases of the full dictionary. Each rectangle comprises a list of sub-strings of some of the textual phrases. The sub-strings in a given rectangle all have the same length and all begin at the same position (character index) in the textual phrases. The rectangles are typically defined so as not to include any wildcard characters, and such that each textual phrase of the full dictionary is represented in at least one of the rectangles (usually in exactly one rectangle).

The disclosed techniques can be used in applications in which the location of the textual phrases in the input data is known, as well as in applications in which the location is unknown. A rectangle-based representative dictionary is highly effective, for example, when the expected location of the textual phrases in the input data is known. In such cases, the input data may be searched rapidly using each rectangle, for example by applying a suitable hash function. Moreover, a rectangle-based representative dictionary can be adapted in a straightforward manner to account for changes in the full dictionary.

System Description

FIG. 1 is a block diagram that schematically illustrates a system 20 for keyword spotting, in accordance with an embodiment that is described herein. System 20 receives communication traffic from a communication network 24, and attempts to detect in the traffic predefined textual phrases, referred to as keywords, drawn from a predefined dictionary. When one or more keywords are detected, the system reports the detection to a user 28 using an operator terminal 32.

System 20 can be used, for example, in an application that detects data leakage from a communication network. In applications of this sort, the presence of one or more keywords in a data item indicates that this data item should not be allowed to exit the network. Alternatively, system 20 can be used in any other suitable application in which input data is searched for occurrences of keywords, such as in intrusion detection and prevention systems, detection of spam in electronic mail (e-mail) systems, or detection of inappropriate content using a dictionary of inappropriate words or phrases.

Although the embodiments described herein refer mainly to processing of communication traffic, the disclosed techniques can also be used in other domains. For example, system 20 can be used for locating data of interest on storage devices, such as in forensic disk scanning applications. Certain additional aspects of keyword spotting are addresses, for example, in U.S. patent application Ser. No. 12/792,796, entitled "Systems and methods for efficient keyword spotting in communication traffic," which is assigned to the assignee of the present patent applications and whose disclosure is incorporated herein by reference.

Network 24 may comprise any suitable public or private, wireless or wire-line communication network, e.g., a Wide-Area network (WAN) such as the Internet, a Local-Area Network (LAN), a Metropolitan-Area Network (MAN), or a combination of network types. The communication traffic, to be used as input data by system 20, may be provided to the system using any suitable means. For example, the traffic may be forwarded to the system from a network element (e.g., router) in network 24, such as by port tapping or port mirroring. In alternative embodiments, system 20 may be placed in-line in the traffic path. These embodiments suitable, for example, for data leakage prevention applications, but can also be used in other applications.

Typically, network 24 comprises an Internet Protocol (IP) network, and the communication traffic comprises IP packets. The description that follows focuses on Transmission Control Protocol Internet Protocol (TCP/IP) networks and TCP packets. Alternatively, however, the methods and systems described herein can be used with other packet types, such as User Datagram Protocol (UDP) packets. Regardless of protocol, the packets searched by system 20 are referred to herein generally as input data.

In the example of FIG. 1, system 20 comprises a Network Interface Card (NIC) 36, which receives TCP packets from network 24. NIC 36 stores the incoming TCP packets in a memory 40, typically comprising a Random Access Memory (RAM). A processor 44 searches the TCP packets stored in memory 40 and attempts to identify occurrences of predefined keywords in the packets.

The keywords that processor 44 attempts to find in the input data are defined in a dictionary 46, referred to as a full dictionary. In addition, in the present example processor device 44 comprises an internal cache memory 48 that holds a representative dictionary 52 derived from the full dictionary. Typically, cache 48 (holding representative dictionary 52) has a much faster access speed than the external memory holding full dictionary 46. Processor 44 typically searches for matches with the representative dictionary stored in the cache, and, only upon such a match, locates the corresponding keyword in the full dictionary. These techniques, as well as examples of full and representative dictionaries, are provided further below.

In some embodiments, processor 44 comprises multi-level cache circuitry, and cache 48 comprises a Level-2 (L2) cache of the processor. Access to the L2 cache is typically faster than access to conventional RAM. As such, access to representative dictionary 52 is considerably faster than access to full dictionary 46.

When processor 44 detects a given keyword in a given packet, it reports the detection to user 28 using an output device of terminal 32, such as a display 56. For example, the processor may issue an alert to the user and/or present the data item (e.g., packet or session) in which the keyword or keywords were detected. In some embodiments, processor 44 may take various kinds of actions in response to detecting keywords. For example, in a data leakage or intrusion prevention application, processor 44 may block some or all of the traffic upon detecting a keyword. User 28 may interact with system 20 using an input device of terminal 32, e.g., a keyboard 60. For example, the user may enter or modify the list of keywords.

The system configuration shown in FIG. 1 is an example configuration, which is chosen purely for the sake of conceptual clarity. Alternatively, any other suitable system configuration can be used. Generally, the different elements of system 20 may be carried out using software, hardware or a combination of hardware and software elements. In some embodiments, processor 44 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Keyword Spotting using Representative Dictionary

As explained above, in some cases full dictionary 46 is extremely large, in terms of the number of keywords and/or in terms of keyword length. Searching the input data using the full dictionary may be problematic and sometimes impossible within the available resources and constraints. For example, the full dictionary may be too large to fit in cache 48, in which case the search involves many external memory operations and is extremely slow. Generally, searching using the full dictionary may limit the search speed (e.g., prevent real-time search) and/or limit the possible dictionary size.

Thus, in some embodiments that are described herein, processor 44 searches the input data in RAM 40 using representative dictionary 52 instead of using full dictionary 46. Representative dictionary 52 typically comprises sub-strings of textual phrases from full dictionary 46. Processor 44 typically derives representative dictionary 52 from full dictionary 46 while meeting several conditions.

A first condition is that the overall data size of representative dictionary 52 is considerably smaller than that of full dictionary 46. For example, the sub-strings in the representative dictionary are typically much shorter that the textual phrases in the full dictionary. Additionally or alternatively, it is permitted to represent multiple textual phrases in the full dictionary using the same sub-string in the representative dictionary.

A second condition is that any occurrence of a textual phrase from the full dictionary in the input data corresponds to a respective occurrence of a sub-string of the representative dictionary. In other words, searching the input data with the representative dictionary instead of the full dictionary is not permitted to miss any occurrences of textual phrases.

A third condition is a small probability of false-positive detections by the representative dictionary. In other words, detecting a sub-string from the representative dictionary in the input data should be highly likely to indicate an occurrence of a textual phrase from the full dictionary. This condition can be met, for example, by avoiding sub-strings that are known a-priori to be likely to cause false-positive detections.

When the representative dictionary meets the above conditions, it is possible for processor 44 to search the input data in RAM 40 using the representative dictionary instead of using the full dictionary. Only upon identifying a textual phrase from the representative dictionary in the input data, processor 44 accesses the full dictionary in order to identify the corresponding textual phrase from the full dictionary.

In the example configuration of FIG. 1, the entire representative dictionary is stored in internal cache 48 of processor 44. As such, the search process is extremely fast since it involves only access to the internal cache, until a match is found in the representative dictionary. Only at this point, processor 44 accesses the full dictionary in order to find the textual phrase in the full dictionary that corresponds to this match.

Figure 2:
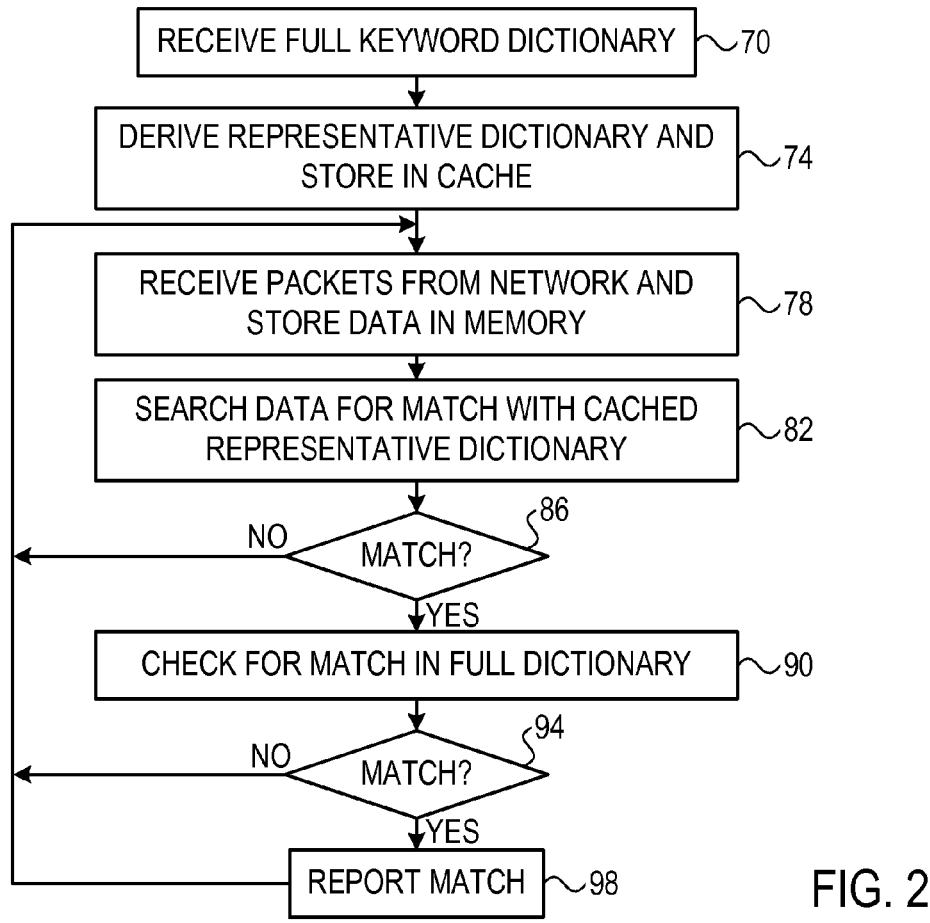
FIG. 2 is a flow chart that schematically illustrates a method for keyword searching, in accordance with an embodiment that is described herein.

FIG. 2 is a flow chart that schematically illustrates a method for keyword searching, in accordance with an embodiment that is described herein. The method begins with system 20 receiving full dictionary 46, at a full dictionary input step 70. Processor 44 stores the full dictionary in some external memory. Processor 44 derives representative dictionary 52 from full dictionary 46, at a dictionary derivation step 74. Processor 44 stores the representative dictionary in internal cache 48.

System 20 receives packets (referred to as input data) from network 24 via NIC 36, and stores the packets in RAM 40, at a data input step 78. Processor 44 searches the packets using representative dictionary 52, at a searching step 82.

Processor 44 checks whether a match is found between a portion of the input data and any of the textual phrases (sub-strings) of the representative dictionary, at a representative matching step 86. If no match is found, the method loops back to step 78 above in which system 20 receives subsequent input data.

If a match is found with one of the textual phrases of the representative dictionary, processor 44 accesses full dictionary 46, at a full dictionary access step 90. The processor attempts to identify the textual phrase in the full dictionary, which corresponds to the match with the representative dictionary found at step 86. Processor checks for the corresponding match with the full dictionary, at a full matching step 94.

In some embodiments, processor 44 uses information relating to the match with the representative dictionary to reduce the scope of the corresponding search in the full dictionary. The scope reduction may involve narrowing down the strings that are to be searched, and/or the locations in the input data that are to be searched. For example, processor 44 may search only the strings of the full dictionary in which the matched sub-string occurs. Additionally or alternatively, processor 44 may identify the location in the input data where the match with the representative dictionary was found, and then attempt to find the corresponding match with the full dictionary only in the vicinity of that location.

(Searching in the vicinity of the indicated location in the full dictionary may involve examining earlier data in a real-time data stream, sometimes on the order of hundreds of bytes before the current location. In order to do so, processor 44 may need to retain a previous packet in some "delay buffer" in addition to the currently-processed packet. For example, in some cases a URL can be spread across two packets, starting in one packet and ending in the next packet. The portion of the URL that is present in the representative dictionary may fall in the second packet, while checking the complete URL may require the processor to go back to the previous pack and screen the end of the packet.)

If the corresponding match with the full directory is not found (i.e., in case of a false positive at step 86) the method loops back to step 78 above. If the corresponding match with the full directory is found, processor 44 reports the match to operator 28 using operator terminal 32, at an output step 98.

In various embodiments, processor 44 may derive different kinds of representative dictionaries in any suitable way. In some embodiments, the textual phrases in the full dictionary may comprise wildcard characters, such as a "?" wildcard character indicating a match with any single character, or a "*" wildcard character indicating a match with any number of characters. Generally, the textual phrases of the full directory may comprise regular expressions or any other suitable way of representing approximate matches. The textual phrases of the representative dictionary, on the other hand, typically (although not necessarily) do not include wildcard characters and correspond only to exact matches.

"Rectangle"-Based Representative Dictionary

FIG. 3 is a diagram that schematically illustrates an example of a full dictionary 100 and a representative dictionary 112 used in a keyword spotting process, in accordance with an embodiment that is described herein. In the present example, full dictionary 100 comprises multiple textual phrases 104, which may be of the same length or of different lengths. Some of textual phrases 104 of the full dictionary comprise "?" wildcard characters 108.

The representative dictionary in this example comprises one or more lists of sub-strings, in the present example two lists 112A and 112B. As can be seen in the figure, each list (each rectangle of the representative dictionary) comprises sub-strings of one or more textual phrases 104, which have the same length and which begin at the same position in the textual phrase. For this reason the lists are sometimes referred to herein as "rectangles."

Processor 44 may define the representative dictionary using any desired number of such lists, or even using a single list. Each textual phrase 104 of the full dictionary is represented by at least one sub-string in one of the lists of the representative dictionary. In most cases, each textual phrase 104 is represented by exactly one sub-string in one of the lists of the representative dictionary. Additionally, the lists are derived by processor 44 so as to meet the three conditions described above (reduced size, corresponding matches with the full dictionary, small probability of false-positives).

Typically, the sub-strings in the representative dictionary do not include any wildcard characters. For example, the textual phrase immediately below rectangle 112A comprises a sequence of three "?" characters 108. Otherwise, processor 44 may have included this textual phrase in rectangle 112A rather than in rectangle 112B.

In an example embodiment, processor 44 defines the representative dictionary such that sub-strings that are expected to cause false-positive detection are excluded from the rectangles. In some cases, when recognizing that a certain sub-string should not be used because it is common and likely to cause false-positive detections, a possible solution is to represent the string in question by another sub-string, in a different rectangle. When the location of the textual phrases in the input data is unknown, however, it may not be possible to exclude the sub-string, and the processor has to include it in the representative dictionary in spite of the possible false-positive detections. Additionally or alternatively, processor 44 has the freedom to modify the order of strings 104 in order to improve the rectangle selection.

In some embodiments, processor 44 stores the sub-strings of the reduced dictionary (i.e., rectangles 112A and 112B) in cache 48. Processor 44 searches the input data for occurrences of the sub-strings of rectangles 112A and 112B. Any occurrence of a sub-string is indicative, with high likelihood, of the corresponding textual phrase 104 of the full dictionary.

Since the sub-strings of each list (rectangle) begin at the same position and have the same length, it is possible for processor 44 to search efficiently for a match with a given list. In an example embodiment, processor 44 applies a suitable hash function to a given portion of the input data, and compares the result of the hash function to the sub-strings of a given list. In this way, a large number of sub-strings can be searched practically in parallel. The hash function is typically produced as part of the derivation of the representative dictionary from the full dictionary. Alternatively, however, processor 44 may search for matches with the sub-strings of the representative dictionary in any other suitable way.

The rectangle-based representative dictionary configuration of FIG. 3 is particularly suitable for applications in which the expected location of the textual phrase in the input data is known at least approximately. When searching for keywords in communication packets, for example, it may be known to processor 44 that the keywords are located in a certain part of the packet, e.g., in the packet header or in a particular area of the packet payload. In such a case, processor 44 may shorten the search by considering the expected location of the keyword and the location of the sub-string within the keyword.

For example, consider a scenario in which the keyword is expected starting from the tenth character of the packet. When searching a packet using the sub-strings of rectangle 112A, there is no need to compare the sub-strings to the first characters of the packet, since (1) the keyword is expected only from the tenth character, and since (2) rectangle 112A lies between the fifteenth and twenty-first characters of the keyword. Therefore, processor 44 may begin searching for the sub-strings of rectangle 112A at the twenty-fifth character of the packet without risk of missing the keyword.

The representative dictionary configuration of FIG. 3 is also highly effective in dynamic dictionary applications, in which keywords of the full dictionary are added, deleted or modified over time. In some embodiments, in response to an addition, deletion or modification of a keyword in the full dictionary, processor 44 adapts the representative dictionary by adding, deleting or modifying a list of sub-strings (rectangle), and/or by merging existing rectangles. When using a hash function as described above, the hash function can be adapted incrementally so as to account for the change in keyword. In any case, the adaptation is incremental, and there is no need to regenerate or re-compile the entire representative dictionary.

Although the embodiments described herein mainly address keyword spotting in communication traffic, the principles of the present disclosure can also be used for identifying textual phrases in any other suitable type of data for any other suitable purpose.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method comprising operations performed by a computer, the operations comprising:
holding a first dictionary comprising first textual phrases for searching in data;
deriving from the first dictionary a second dictionary, which comprises second textual phrases and has a smaller data size than the first dictionary, such that occurrence of any of the first textual phrases in the data corresponds to the occurrence of at least one of the second textual phrases in the data;
searching input data with the second dictionary; and
in response to identifying in the input data a second textual phrase from the second dictionary, locating in the input data a first textual phrase from the first dictionary corresponding to the identified second textual phrase.

2. The method according to claim 1, wherein the second dictionary is derived such that any occurrence of one of the second textual phrases indicates the occurrence of one of the first textual phrases with a likelihood higher than a predefined threshold.

3. The method according to claim 1, wherein holding the first dictionary comprises storing the first dictionary in a first memory having a first access speed, and wherein deriving the second dictionary comprises storing the second dictionary in a second memory having a second access speed that is higher than the first access speed.

4. The method according to claim 3, wherein searching the input data comprises processing the input data using a processor, and wherein the second memory comprises a cache memory of the processor.

5. The method according to claim 1, wherein identifying the second textual phrase comprises specifying a partial subset of the first textual phrases based on the identified second textual phrase, and wherein locating the first textual phrase comprises searching only the partial subset of the first textual phrases.

6. The method according to claim 1, wherein identifying the second textual phrase comprises indicating a position in the input data where the first textual phrase is expected, and wherein locating the first textual phrase comprises accessing the input data in a vicinity of the indicated location.

7. The method according to claim 1, wherein deriving the second dictionary comprises excluding from the second dictionary one or more second textual phrases that are expected to cause false detections while searching the input data with the second dictionary.

8. The method according to claim 1, wherein deriving the second dictionary comprises defining one or more lists of the second textual phrases, such that, in each list, the second textual phrases are derived as the sub-strings of respective ones of the first textual phrases that begin at a given constant position in the first textual phrases and have a given constant length.

9. The method according to claim 8, wherein one or more of the first textual phrases comprise wildcard characters, and wherein defining the lists comprises choosing the lists such that the second textual phrases do not comprise any of the wildcard characters.

10. The method according to claim 8, wherein searching the input data with the second dictionary comprises applying a hash function to a portion of the input data, and comparing a result of the hash function to the sub-strings in a given list.

11. Apparatus, comprising:
a memory, which is configured to hold a first dictionary comprising first textual phrases for searching in data; and
a processor, which is configured to derive from the first dictionary a second dictionary, which comprises second textual phrases and has a smaller data size than the first dictionary, such that occurrence of any of the first textual phrases in the data corresponds to the occurrence of at least one of the second textual phrases in the data, to search input data with the second dictionary, and, in response to identifying in the input data a second textual phrase from the second dictionary, to locate in the input data a first textual phrase from the first dictionary corresponding to the identified second textual phrase.

12. The apparatus according to claim 11, wherein the processor is configured to derive the second dictionary such that any occurrence of one of the second textual phrases indicates the occurrence of one of the first textual phrases with a likelihood higher than a predefined threshold.

13. The apparatus according to claim 11, wherein the memory holding the first dictionary comprises a first memory having a first access speed, and comprising a second memory, which is configured to hold the second dictionary and which has a second access speed that is higher than the first access speed.

14. The apparatus according to claim 13, wherein the second memory comprises a cache memory of the processor.

15. The apparatus according to claim 11, wherein the processor is configured to specify a partial subset of the first textual phrases based on the identified second textual phrase, and to locate the first textual phrase by searching only the partial subset of the first textual phrases.

16. The apparatus according to claim 11, wherein, based on identifying the second textual phrase, the processor is configured to indicate a position in the input data where the first textual phrase is expected, and to locate the first textual phrase by accessing the input data in a vicinity of the indicated location.

17. The apparatus according to claim 11, wherein the processor is configured to exclude from the second dictionary one or more second textual phrases that are expected to cause false detections while searching the input data with the second dictionary.

18. The apparatus according to claim 11, wherein the processor is configured to derive the second dictionary by defining one or more lists of the second textual phrases, such that, in each list, the second textual phrases are derived as the sub-strings of respective ones of the first textual phrases that begin at a given constant position in the first textual phrases and have a given constant length.

19. The apparatus according to claim 18, wherein one or more of the first textual phrases comprise wildcard characters, and wherein the processor is configured to define the lists such that the second textual phrases do not comprise any of the wildcard characters.

20. The apparatus according to claim 18, wherein the processor is configured to search the input data with the second dictionary by applying a hash function to a portion of the input data, and comparing a result of the hash function to the sub-strings in a given list.

* * * * *